United States Patent

Taminini

[11] 3,924,966
[45] Dec. 9, 1975

[54] WIND DRIVEN POWER GENERATOR

[76] Inventor: Robert J. Taminini, 4 Pinewood Road, Wyomissing, Pa. 19610

[22] Filed: Sept. 25, 1974

[21] Appl. No.: 509,349

[52] U.S. Cl. .................. 416/177; 416/9; 416/181
[51] Int. Cl.² ........................................ F03D 1/06
[58] Field of Search ....... 416/9, 176, 177, 189, 178, 416/181

[56] References Cited
UNITED STATES PATENTS

| 4,963 | 2/1847 | Armstrong et al. ............... 416/189 |
| 104,918 | 6/1870 | St. Clair ......................... 416/189 X |
| 172,015 | 1/1876 | Guthery ............................ 416/13 |
| 663,337 | 12/1900 | Gemmill ........................... 416/189 |
| 996,309 | 6/1911 | Carlson ........................... 416/176 X |
| 1,370,083 | 3/1921 | Blackmore ........................ 416/189 |
| 2,106,928 | 2/1938 | Lee ................................ 416/178 |
| 2,137,559 | 11/1938 | Algee .............................. 416/189 |

FOREIGN PATENTS OR APPLICATIONS

| 96,619 | 4/1924 | Austria ............................. 416/176 |
| 101,198 | 10/1925 | Austria ............................. 416/9 |
| 609,764 | 11/1960 | Canada ............................ 416/189 |
| 7,946 | 1839 | United Kingdom .............. 416/176 |
| 423,582 | 7/1947 | Italy ............................... 416/177 |
| 66,737 | 9/1943 | Norway ........................... 416/176 |

*Primary Examiner*—Everette A. Powell, Jr.
*Attorney, Agent, or Firm*—Clarence A. O'Brien; Harvey B. Jacobson

[57] ABSTRACT

A rotor body is provided including a generally cylindrical side wall open at its opposite ends and supported for rotation about an axis generally coinciding with the center axis of the body. The body includes a plurality of circumferentially spaced longitudinally extending slots similarly slightly inclined relative to radial planes passing through the slots and the edge portions of the cylindrical side wall defining corresponding longitudinal edges of the slots include inwardly projecting vanes inclined at least thirty degrees relative to planes tangent to the cylindrical side wall edges inwardly from which the vanes extend.

4 Claims, 3 Drawing Figures

WIND DRIVEN POWER GENERATOR

BACKGROUND OF THE INVENTION

Various forms of wind-driven rotors have been heretofore designed. However, most wind rotors are constructed for optimum performance within a narrow band of wind velocities and are expensive to manufacture. Examples of various forms of wind rotors including some of the features of the instant invention are disclosed in U.S. Pat. Nos. 616,301, 672,877, 774,168, 1,181,988, 2,106,928, 2,329,675, 3,374,849, 3,444,946 and 3,556,239.

BRIEF DESCRIPTION OF THE INVENTION

The wind rotor of the instant invention is generally cylindrical in configuration and includes circumferentially spaced longitudinally extending slots similarly inclined relative to radial planes passing through the slots. Corresponding edge portions of the slots include inwardly projecting vanes extending therealong and the opposite ends of the cylindrical wind rotor are open for the passage of air therethrough.

The wind rotor may be journaled for rotation about an axis extending in the direction of movement of an associated vehicle from which the wind rotor is journaled, or the wind rotor may be mounted on a stationary support by means of a turntable structure and equipped with a wind vane whereby one end of the wind rotor will face into the wind at all times. The wind rotor includes a central shaft from which rotational torque developed by the wind rotor may be realized and harnessed in any convenient manner.

The invention disclosed herein is the subject of Disclosure Document No. 029022, dated Mar. 1, 1974.

The main object of this invention is to provide a wind rotor constructed in a manner so as to be efficient throughout a wide band of wind velocities.

Another object of this invention, in accordance with the immediately preceding object, is to provide a wind rotor of simple construction and which may be produced at a low cost.

Another important object of this invention is to provide a wind rotor whose structural features render it adaptable for use on a vehicle as well as for use on a stationary object subject to surface winds.

A final object of this invention to be specifically enumerated herein is to provide a wind rotor in accordance with the preceding objects and which will conform to conventional forms of manufacture, be of simple construction and efficient in operation so as to provide a device that will be economically feasible, long lasting and capable of generating considerable torsional forces.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
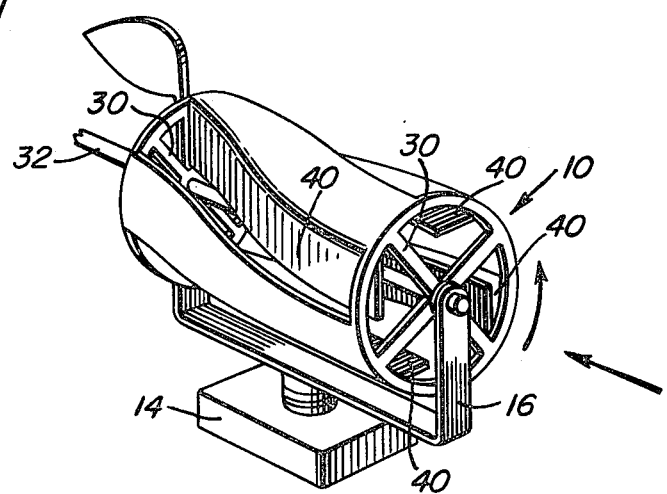
FIG. 1 is a perspective view of the wind rotor of the instant invention journaled from a mount supported for oscillation about an axis disposed generally normal to the axis of rotation of the wind rotor.

Referring now more specifically to the drawings the numeral 10 generally designates the wind driven power generator of the instant invention. The generator 10 includes a stationary base 14 from which a bifurcated mount 16 is supported for oscillation about a vertical axis. The mount 16 includes a pair of upstanding support arms 18 and 20 interconnected at their lower ends by means of a horizontal bight portion 22 and the bight portion 22 is oscillatably supported from the base 14 by means of a bearing assembly 23.

The generator 10 further includes a rotor referred to in general by the reference numeral 24 and the rotor 24 includes a body having a generally cylindrical side wall 26 and open at its opposite ends. The cylindrical side wall 26 includes a plurality of circumferentially spaced and longitudinally extending slots 28 which are similarly slightly inclined relative to radial planes of the rotor 24 passing through the slots 28. The opposite ends of the rotor include cruciform spiders 30 through the centers of which a central shaft 32 projects.

The opposite ends of the shaft 32 are journaled through the upper end portion of the support arm 18 and a corresponding portion of the support arm 20, the support arm 20 including an upwardly projecting extension 34 which projects above the upper periphery of the rotor 24 and has a wind vane 36 supported therefrom. The wind vane 36 projects away from the support arm 18 outwardly from the rear end of the generator 10.

Corresponding edge portions of the side wall 26 defining corresponding longitudinal edges of the slots 28 include integral inwardly projecting vanes 40 and the vanes 40 are disposed in planes inclined at least 30° and preferably 45° relative to planes tangent to the edge portions of the side wall 26 inwardly from which the vanes 40 extend.

Adjacent slots 28 are spaced apart about the side wall 26 a distance substantially equal to the circumferential extent of the slots 28 and the width of the vanes 40 from their outer edge portions to their inner edge portions is substantially equal to the width of the slots 28. Accordingly, given a cylindrical body such as the rotor 24 constructed of bendable material, the rotor 24 may be formed merely by forming U-shaped cuts in the side wall 26 and laterally inwardly displacing the portions of the side wall 26 enclosed within the U-shaped cuts. Of course, the support spiders 30 may be added to the opposite ends of the rotor 24 in any convenient manner.

Figure 2:
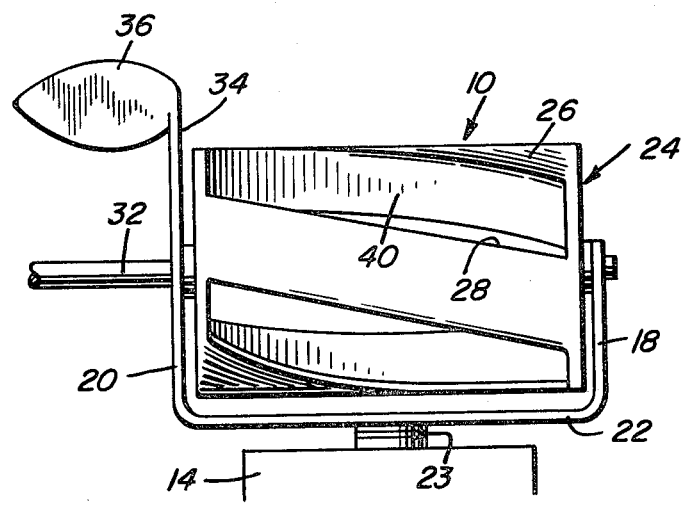
FIG. 2 is a side elevational view of the assemblage illustrated in FIG. 1 and on somewhat of an enlarged scale.
Figure 3:
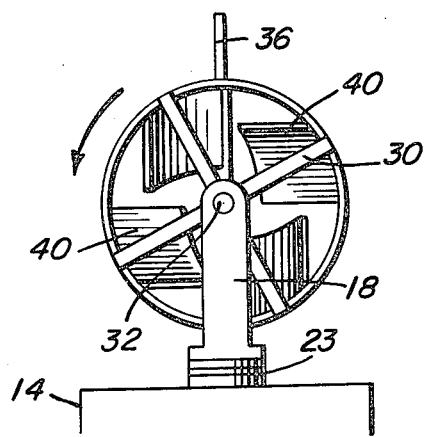
FIG. 3 is an end elevational view of the assemblage illustrated in FIGS. 1 and 2 as seen from the right side of FIG. 2.

As disclosed, the generator 10 is designed to have the base 14 mounted on a stationary object subject to surface winds and the mount 16 together with the vane 36 will be capable of maintaining the forward end of the rotor 24 supported from the support arm 18 facing into the wind at all times. However, a mount similar to mount 16 may be utilized to journal the rotor 24 for rotation about a horizontal axis from a vehicle with the horizontal axis extending in the direction of intended movement of the vehicle. Also, from FIG. 2 of the drawings it will be seen that the slots 28 are inclined approximately 15° relative to radial planes of the rotor 24 extending through the slots 28 and it may be appreciated that the arms of the spiders 30 may be foil-shaped and slightly inclined approximately 15° relative to radial planes of the rotor 24 extending along the arms of the spiders 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wind rotor comprising an elongated cylindrical body of a length greater than its diameter, having a cylindrical side wall and open at its opposite ends and journaled for rotation about an axis generally coinciding with the center axis of said body, said body including a plurality of circumferentially spaced longitudinally extending slots similarly slightly inclined relative to radial planes passing through said slots, corresponding edge portions of said cylindrical side wall defining corresponding longitudinal edges of said slots including integral inwardly projecting substantially rectangular vanes inclined at least thirty degrees relative to planes tangent to said cylindrical side wall edges, the width of said vanes being substantially equal to the width of said slots and said vanes comprising inwardly deflected integral portions of said cylindrical side wall, the width of said vanes, from the base longitudinal edges thereof supported from said side wall to the remote free longitudinal edges thereof, being equal to at least one-half the radius of said body.

2. The combination of claim 1 including a base from which said body is journaled, said base including support means for mounting said base for oscillation about an axis disposed substantially normal to the first-mentioned axis.

3. The combination of claim 1 wherein said body includes opposite end spider assemblies including portions defining journal means from which said body is journaled.

4. The combination of claim 1 wherein the width of said slots is substantially equal to the spacing between said slots.

* * * * *

UNITED STATES PATENT OFFICE
CERTIFICATE OF CORRECTION

Patent No. 3,924,966                Dated December 9, 1975

Inventor(s) ROBERT J. TAMANINI

It is certified that error appears in the above-identified patent and that said Letters Patent are hereby corrected as shown below:

Inventor's name misspelled as Taminini---------

SHOULD BE ROBERT J. TAMANINI

*Signed and Sealed this*

*thirteenth* Day of *April 1976*

[SEAL]

Attest:

RUTH C. MASON
*Attesting Officer*

C. MARSHALL DANN
*Commissioner of Patents and Trademarks*